United States Patent
Ishizaki (10) Patent No.: US 10,168,536 B2
(45) Date of Patent: Jan. 1, 2019

(54) HEAD-MOUNTED DISPLAY AND IMAGE DISPLAY DEVICE

(71) Applicant: Brother Kogyo Kabushiki Kaisha, Nagoya-shi, Aichi-ken (JP)

(72) Inventor: Hirotoshi Ishizaki, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/713,860

(22) Filed: Sep. 25, 2017

(65) Prior Publication Data

US 2018/0011326 A1    Jan. 11, 2018

Related U.S. Application Data

(63) Continuation-in-part of application No. PCT/JP2016/060065, filed on Mar. 29, 2016.

(30) Foreign Application Priority Data

Mar. 31, 2015 (JP) ................. 2015-070678

(51) Int. Cl.
  *G02B 27/01* (2006.01)
  *G02B 27/02* (2006.01)
  *H04N 5/64* (2006.01)

(52) U.S. Cl.
  CPC ..... *G02B 27/0172* (2013.01); *G02B 27/0176* (2013.01); *G02B 27/02* (2013.01);
  (Continued)

(58) Field of Classification Search
  CPC ................... G06F 3/012; G06F 1/00
  See application file for complete search history.

(56) References Cited

U.S. PATENT DOCUMENTS

| | | | |
|---|---|---|---|
| 7,808,714 B2 | 10/2010 | Ando | |
| 9,874,757 B2 | 1/2018 | Kusuda et al. | |
| 2002/0149545 A1* | 10/2002 | Hanayama | G02B 27/017 345/7 |
| 2006/0007562 A1* | 1/2006 | Willey | A42B 3/042 359/811 |

(Continued)

FOREIGN PATENT DOCUMENTS

| | | |
|---|---|---|
| EP | 3193498 A1 | 7/2017 |
| JP | 2006-319440 A | 11/2006 |

(Continued)

OTHER PUBLICATIONS

Oct. 3, 2017—(WO) IPRP—App PCT/JP2016/060065.

(Continued)

*Primary Examiner* — Md Saiful A Siddiqui
(74) *Attorney, Agent, or Firm* — Banner & Witcoff, Ltd.

(57) ABSTRACT

Provided are a head-mounted display and an image display device. The HMD includes a first ball joint, a second ball joint and an arm member. The first ball joint is provided with a first rod portion and a first sphere portion. The second ball joint is provided with a second rod portion and a second sphere portion. The first rod portion passes through a first hole portion. The second rod portion passes through a second hole portion. A position of a half mirror in a first position of a display casing when the first rod portion is positioned at the center of the first hole portion and the second rod portion is positioned at the center of the second hole portion is farther from the mounting member than a position of the half mirror in a second position of the display casing.

9 Claims, 9 Drawing Sheets

(52) U.S. Cl.
CPC ....... *H04N 5/64* (2013.01); *G02B 2027/0159* (2013.01); *G02B 2027/0178* (2013.01)

(56) References Cited

U.S. PATENT DOCUMENTS

| | | |
|---|---|---|
| 2007/0217001 A1 | 9/2007 | Ando |
| 2011/0089207 A1* | 4/2011 | Tricoukes ............... H04M 1/05 224/181 |
| 2011/0090135 A1* | 4/2011 | Tricoukes .......... G02B 27/0176 345/8 |
| 2015/0378160 A1* | 12/2015 | Lee .................... G02B 27/0172 345/8 |
| 2016/0178912 A1 | 6/2016 | Kusuda et al. |
| 2017/0168305 A1 | 6/2017 | Kusuda et al. |

FOREIGN PATENT DOCUMENTS

| | | |
|---|---|---|
| JP | 2007-251593 A | 9/2007 |
| JP | 4363929 B2 | 11/2009 |
| JP | 2011-075951 A | 4/2011 |
| JP | 2013-175947 A | 9/2013 |
| WO | 2015030099 A1 | 3/2015 |
| WO | 2015030100 A1 | 3/2015 |

OTHER PUBLICATIONS

Apr. 10, 2018—(JP) Office Action—App 2017-057191.
Jun. 21, 2016—International Search Report—Intl App PCT/JP2016/060065.
Oct. 31, 2018—(EP) Extended search report—App 16772806.2.

\* cited by examiner

HEAD-MOUNTED DISPLAY AND IMAGE DISPLAY DEVICE

CROSS-REFERENCE TO RELATED APPLICATIONS

This application is a Continuation-In-Part application of PCT International Application No. PCT/JP2016/060065 which has an International filing date of Mar. 29, 2016 and designated the United States of America, and claiming priority on Patent Application No. 2015-070678 filed in Japan on Mar. 31, 2015.

TECHNICAL FIELD

The present disclosure relates to a head-mounted display capable of being mounted on a head of a user and an image display device.

BACKGROUND

Conventionally, a head-mounted display that can be mounted on a head of a user has been known. A conventional image provision device comprises a support member that is included in a head set and an optical housing, for example. In the image provision device, a ball joint extends downward from the support member so as to be connected to the optical housing. Thus, the optical housing is movable in the horizontal direction with respect to the support member, by the ball joint.

SUMMARY

In the above-described conventional image provision device, the ball axis of the ball joint extends in an upper and lower direction. Thus, the optical housing is configured to mainly horizontally move and has a movable range narrow in the upper and lower direction. The optical housing moves in the horizontal direction with the ball axis being centered. However, the movable range includes a position where the optical housing touches a face of a user. Thus, in the case that the head set is mounted on the head of the user, the optical housing cannot be disposed within the range where the optical housing interferes with the face of the user. This causes a problem of narrowing the movable range of the optical housing that is available.

The object of the present disclosure is to provide a head-mounted display and an image display device that are capable of widening an available movable range.

An head-mounted display according to a first aspect of the present disclosure is a head-mounted display comprising: a mounting member that is curved in an arch shape and is able to be mounted on a head of a user; a display casing that includes a display unit and an emission unit which is able to deflect image light from the display unit and emit the image light in a first direction, and that extends in a second direction being one side of a direction orthogonal to the first direction; an arm member that extends from the mounting member to the display casing; a first ball joint that connects the mounting member to the arm member; a second ball joint that connects to the arm member a portion closer to a side of the second direction than the emission unit in the display casing; a first ball stud that is included in the first ball joint and is provided with a first rod portion and a first sphere portion disposed at one end of the first rod portion; a first socket that is included in the first ball joint, slidably supports the first sphere portion and is provided with a first hole portion through which the first rod portion passes; a second ball stud that is included in the second ball joint and is provided with a second rod portion and a second sphere portion disposed at one end of the second rod portion; and a second socket that is included in the second ball joint, slidably supports the second sphere portion and is provided with a second hole portion through which the second rod portion passes, wherein a position of the emission unit in a first position of the display casing when the first rod portion is positioned at a center of the first hole portion and the second rod portion is positioned at a center of the second hole portion, is farther from the mounting member than a position of the emission unit in a second position of the display casing when a virtual plane that is orthogonal to the first direction and the second direction and that is orthogonal to a middle of an outer periphery of the mounting member is parallel to the first direction in which the image light is emitted.

An image display device according to a second aspect of the present disclosure is an image display device comprising: a display casing that is provided with a display unit and an emission unit which is able to deflect image light from the display unit and emit the image light in a first direction, and that extends in a second direction being one side of a direction orthogonal to the first direction; an arm member that extends from a mounting member capable of being mounted on a head to the display casing; a first ball joint that connects the mounting member to the arm member; a second ball joint that connects to the arm member a portion closer to a side of the second direction than the emission unit in the display casing; a first ball stud that is included in the first ball joint and is provided with a first rod portion and a first sphere portion disposed at one end of the first rod portion; a first socket that is included in the first ball joint, slidably supports the first sphere portion, and is provided with a first hole portion through which the first rod portion passes; a second ball stud that is included in the second ball joint and is provided with a second rod portion and a second sphere portion disposed at one end of the second rod portion; and a second socket that is included in the second ball joint, slidably supports the second sphere portion and is provided with a second hole portion through which the second rod portion passes, wherein the second rod portion is provided with a bent portion that is bent nearer in a direction away from the mounting member when the first rod portion is positioned at a center of the first hole portion and the second rod portion is positioned at a center of the second hole portion.

The above and further objects and features will more fully be apparent from the following detailed description with accompanying drawings.

DETAILED DESCRIPTION

Figure 1:
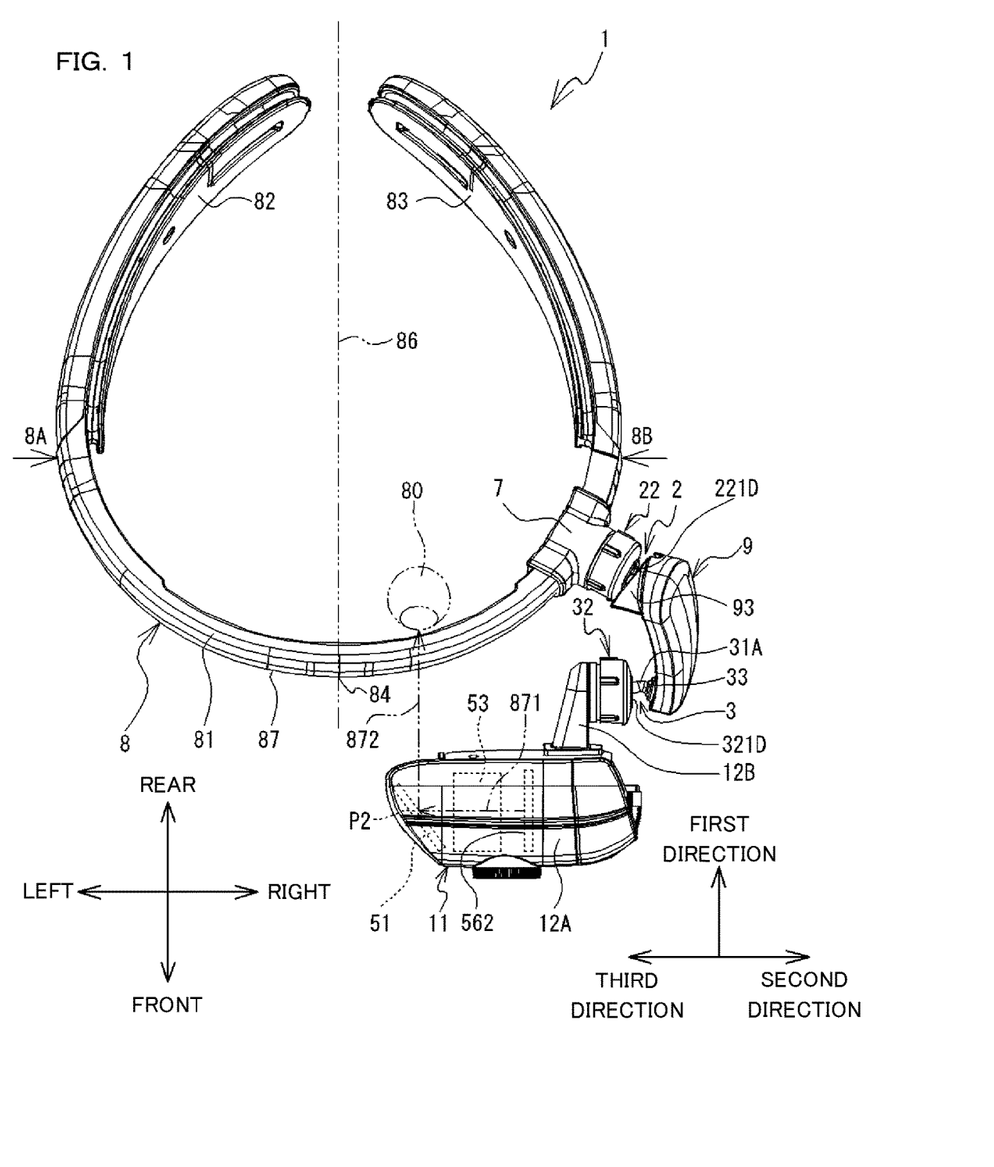
FIG. 1 is a plan view of an HMD 1 with a display casing 11 being in a second position.

Hereinafter, an embodiment of the present disclosure will be described with reference to the accompanying drawings. As illustrated in FIG. 1, a head-mounted display (hereinafter, referred to as "HMD") 1 is an optical transmission type see-through HMD. Light from a landscape in front of eyes of a user is transmitted via a half mirror 51 and is directly guided to the eye 80 of a user. In the HMD 1 a virtual image projection type is employed as a projection type. The half mirror 51 deflects image light of an image, which is displayed on a liquid crystal panel 562 that will be described, emits the image light in a first direction and then guides it toward one eye of the user. The HMD 1 allows the user to perceive an image in a state in which the image overlaps the landscape in front of the eyes. The HMD 1 comprises a mounting member 8, an arm member 9 and a display casing 11.

Figure 2:
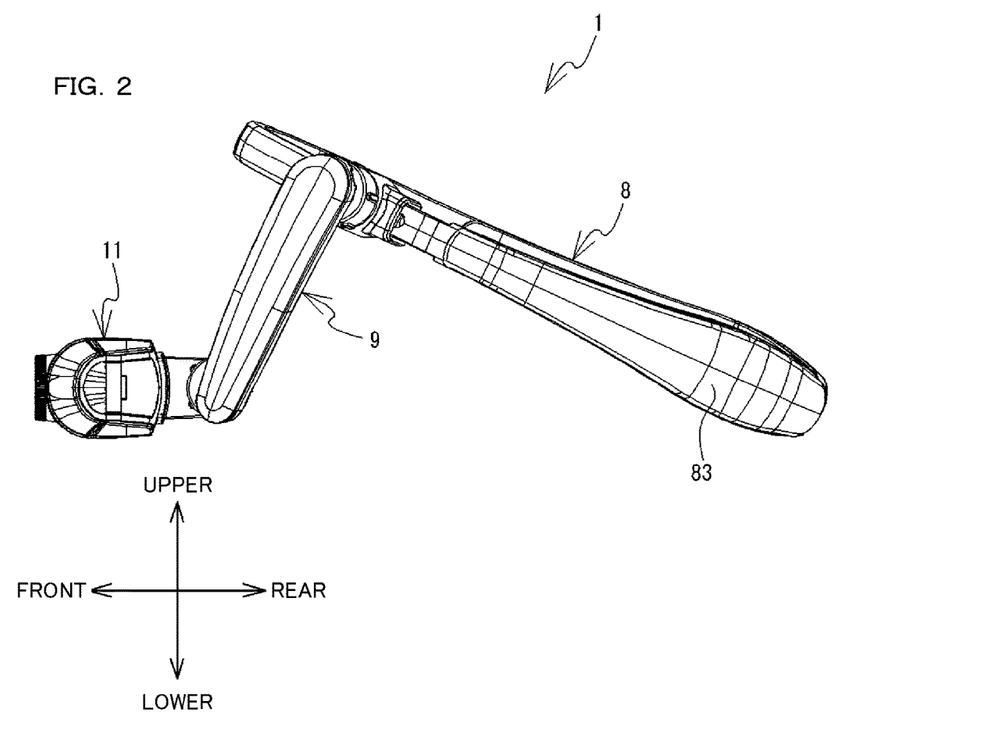
FIG. 2 is a right side view of the HMD 1 with the display casing 11 being in the second position.

Hereafter, a lower side, an upper side, a left side and a right side in FIG. 1 are defined as a front side, a rear side, a left side and a right side of the HMD 1, respectively, and an upper side and a lower side in FIG. 2 are defined as an upper side and a lower side of the HMD 1, respectively. The upper side, the lower side, the left side, the right side, the front side and the rear side of the HMD 1 respectively correspond to an upper side, a lower side, a right side, a left side, a front side and a rear side with respect to a user on which the mounting member 8 is mounted. Also, the direction in which the half mirror 51 emits image light may be called a first direction. One side of a direction orthogonal to the first direction may be called a second direction. The second direction is the right side of the HMD 1 when the HMD 1 is in the position illustrated in FIG. 1, for example. A direction opposite to the second direction may be called a third direction. The upper side, the lower side, the left side, the right side, the front side and the rear side of the HMD 1 are defined based on the mounting member 8. The first direction, the second direction and the third direction are defined based on the display casing 11. Thus, the relation between the upper side, the lower side, the left side, the right side, the front side and the rear side of the HMD 1, and the first direction, the second direction and the third direction changes in accordance with a position of the display casing 11 relative to the mounting member 8.

As illustrated in FIG. 1 and FIG. 2, the mounting member 8 is made of a flexible material such as a resin and metal (for example, stainless steel). The mounting member 8 is formed in an arch shape. The mounting member 8 is provided with a first part 81 and second parts 82 and 83. Hereinafter, description will be given by dividing the mounting member 8 into the first part 81 and the second parts 82 and 83 for convenience in understanding, but the mounting member 8 is actually a single member as a whole without being divided into separate parts such as the first part 81 and the second parts 82 and 83.

The first part 81 and the second parts 82 and 83 are elongated plate-shaped members that are curved, respectively. The first part 81 is a part extending between a position 8A and a position 8B of the mounting member 8 in a right and left direction. The first part 81 is curved in a convex shape toward the front side. The position 8A is located on the left side with respect to the middle 84 of the mounting member 8 and on the front side with respect to the middle in the front and rear direction of the mounting member 8. The position 8A is at the leftmost position of the mounting member 8. The position 8B is located on the right side with respect to the middle 84 in the right and left direction of the mounting member 8 and on the front side with respect to the middle in the front and rear direction of the mounting member 8. The position 8B is at the rightmost position of the mounting member 8. The middle 84 of the mounting member 8 is the forefront of the mounting member 8, for example. The middle 84 of the mounting member 8 may be at the center of the mounting member 8 in the right and left direction. The second part 82 is a part extending rearward from the position 8A of the mounting member 8. The second part 83 is a part extending rearward from the position 8B of the mounting member 8. The second parts 82 and 83 respectively extend in such directions as to be closer to each other at the rear ends. The mounting member 8 is mounted on the head of the user in a state in which the first part 81, the second parts 82 and 83 are brought into contacted with the front side head region, the right side head region and the left side head region of the user, respectively. In this state, the first part 81 extends in the right and left direction along the forehead of the user. Hereafter, an area enclosed by the first part 81 and the second parts 82 and 83 of the mounting member 8 may be called "the inside of the mounting member 8" while a side opposite to the inside of the mounting member 8 may be called "the outside of the mounting member 8."

As illustrated in FIG. 1, the display casing 11 extending in the second direction includes the half mirror 51 at the left end thereof in FIG. 1. More specifically, the display casing 11 is provided with a body member 12A and a protruding member 12B. The body member 12A has an approximately rectangular parallelepiped shape with curved corners and extends in the second direction. The protruding member 12B protrudes toward a side of the first direction from an end of the body member 12A on a side of the second direction. The protruding member 12B is connected with a second ball joint 3 that will be described later, at an end, on the side of the first direction, of the protruding member 12B on the side of the second direction.

The body member 12A includes the half mirror 51, the liquid crystal panel 562, a lens unit 53 and a control substrate (not illustrated). The half mirror 51 is a deflective member that is located at the end in the third direction of the body member 12A. The liquid crystal panel 562 is provided in a middle portion of the body member 12A in the second direction. The liquid crystal panel 562 is a rectangular plate shape and is provided with a display surface on a side of the third direction. The lens unit 53 is provided between the liquid crystal panel 562 and the half mirror 51.

The control substrate receives image data from external equipment through a signal line (not illustrated). The control substrate displays on the liquid crystal panel 562 an image in accordance with the received image data. Image light of the image displayed on the liquid crystal panel 562 is emitted in the third direction (see an arrow 871 in FIG. 1). It is noted that in the present disclosure, a two-dimensional display device such as a digital mirror device (DMD) and an organic electroluminescence (EL) may be used instead of the liquid crystal panel 562. In addition, a retinal scanning display, which projects two-dimensionally scanned light on a retina of a user, may be used.

The lens unit 53 includes a plurality of lenses. The lens unit 53 leads the image light emitted from the liquid crystal panel 562 to the half mirror 51. The half mirror 51 has a rectangular plate shape. The half mirror 51 obliquely extends so as to be positioned in the third direction as it goes toward the first direction. The half mirror 51 can reflect the image light incident through the lens unit 53 in the first direction (see an arrow 872 in FIG. 1). The user can visually perceive a virtual image with the left eye 80 based on the image light reflected in the first direction by the half mirror 51. The half mirror 51 allows external light, which is incident from the direction opposite to the first direction, to be transmitted therethrough in the first direction. The half mirror 51 is formed by depositing metal such as aluminum and silver on a transparent resin or a glass substrate, for example, to have a predetermined reflectivity (for example, 50%).

It is noted that in the present disclosure, a mirror reflection member, which does not allow incident image light to be transmitted in the third direction, may be used instead of the half mirror 51. In this case, the reflective member does not allow external light incident from the direction opposite to the first direction to be transmitted therethrough. Instead of the half mirror 51, a transmissive optical path deflection member such as a prism and a diffraction lattice may be used.

As illustrated in FIG. 1 and FIG. 2, the arm member 9 is a member that extends from the mounting member 8 to the display casing 11. The arm member 9 disposes the half mirror 51 of the display casing 11 in front of the left eye 80 of the user in a state in which the mounting member 8 is mounted on the head of the user. As illustrated in FIG. 2, the arm member 9 extends from the mounting member 8 such that a lower end of the arm member 9 is inclined forward with respect to the upper and lower direction. As illustrated in FIG. 1, the arm member 9 is curved rightward in a convex shape at a middle portion thereof in the upper and lower direction. The arm member 9 is made of resin, metal, and the like.

Figure 3:
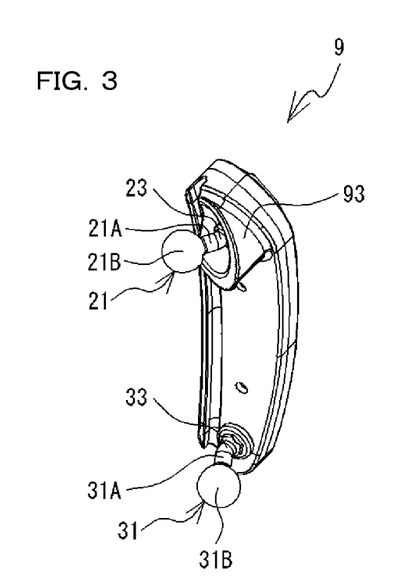
FIG. 3 is a perspective view of an arm member 9.
Figure 4:
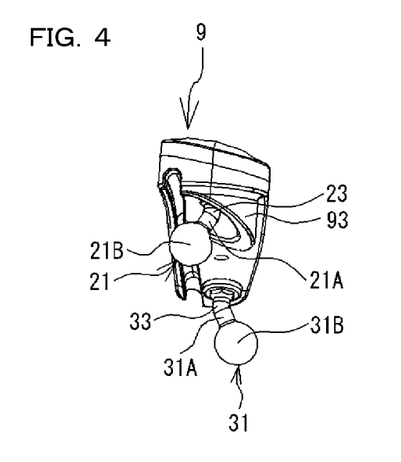
FIG. 4 is another perspective view of the arm member 9.

As illustrated in FIG. 1, FIG. 3 and FIG. 4, the arm member 9 is provided with a cylindrical portion 93 protruding leftward at an upper end thereof. The cylindrical portion 93 is obliquely formed such that a left end thereof is positioned rightward as it goes toward a rear end thereof. As illustrated in FIG. 3 and FIG. 4, inside the cylindrical portion 93, a right end of a first rod portion 21A of a first ball stud 21 that will be described later is disposed. At the left side of the lower end of the arm member 9, a right end of a second rod portion 31A of a second ball stud 31 that will be described later is disposed.

As illustrated in FIG. 1, the mounting member 8 and the upper end of the arm member 9 are connected by a first ball joint 2. The display casing 11 and the lower end of the arm member 9 are connected by the second ball joint 3.

The connection manner between the mounting member 8 and the arm member 9 will be described in detail. As illustrated in FIG. 1, at the right front of the mounting member 8, a connection member 7 is provided. The connection member 7 is connected to a periphery of the first part 81 by a screw, snap-fit mechanism (not illustrated) or the like. A first socket 22 of the first ball joint 2 that will be described later is connected to the mounting member 8 by the connection member 7. That is, the first socket 22 is provided in the mounting member 8.

Figure 5:
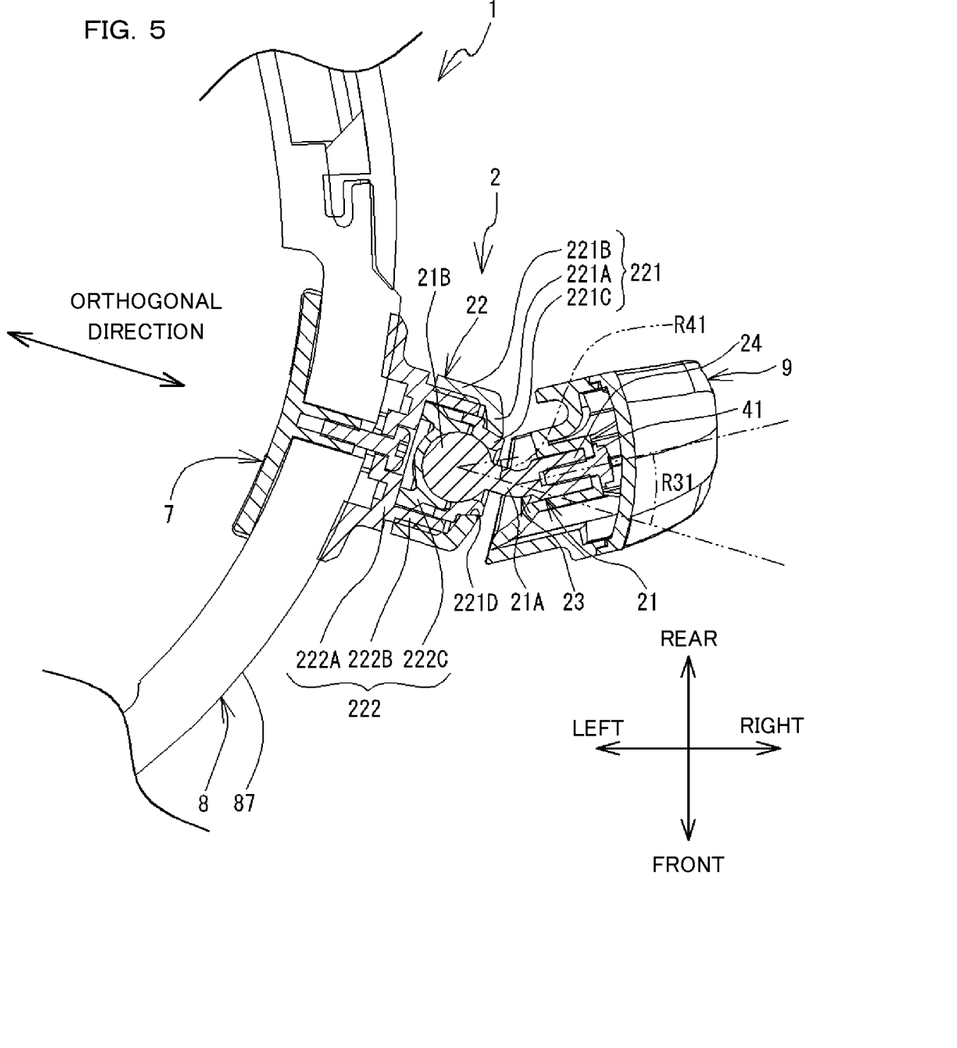
FIG. 5 is a cross-sectional view of the vicinity of a first ball joint 2 when a first rod portion 21A is positioned at the center of a first hole portion 221D.

The first ball joint 2 is made of metal such as stainless steel, brass, titanium or aluminum. As illustrated in FIG. 5, the first ball joint 2 is provided with the first ball stud 21 and the first socket 22. The first ball stud 21 is provided with the first rod portion 21A and a first sphere portion 21B. The first sphere portion 21B is a spherical portion provided at one end, that is, a left end of the first rod portion 21A. The first socket 22 slidably supports the first sphere portion 21B. Hereafter, the first ball joint 2 will be described in detail.

In the following description, at the position of the mounting member 8 where the connection member 7 and the first socket 22 are disposed, a direction orthogonal to an outer periphery 87 of the mounting member 8 is called an "orthogonal direction". A direction going toward the inside of the mounting member 8 may be called "inward in the orthogonal direction" while a direction going toward the outside of the mounting member 8 may be called "outward in the orthogonal direction". Here, "outward in the orthogonal direction" is also a direction of a normal to the outer periphery 87 of the mounting member 8.

As illustrated in FIG. 5, the first socket 22 is provided with a first lid portion 221 and a first receiving portion 222. The first receiving portion 222 is provided with a bottom portion 222A, a side portion 222B and a first contact portion 222C. The bottom portion 222A is a circular plate-shaped portion that is connected to the connection member 7.

The side portion 222B is a cylindrical portion that extends from a perimeter of the bottom portion 222A outward in the orthogonal direction. Screw threads are cut on an outer surface of the side portion 222B. The bottom portion 222A and the side portion 222B are made of a resin material, for example, as a single piece. The first contact portion 222C is provided at a portion surrounded by the side portion 222B. The first contact portion 222C has a recess that is fit into a surface shape of the first sphere portion 21B. The first contact portion 222C is made of an elastically deformable elastic member (resin material such as rubber, urethane) that functions as a cushioning material. The first contact portion 222C contacts a part positioned inward in the orthogonal direction of the first sphere portion 21B of the first ball stud 21.

The first lid portion 221 is provided with a wall portion 221A, a side portion 221B and a first contact portion 221C. The wall portion 221A is a circular plate-shaped portion. A pair of surfaces with a large area of the wall portion 221A face the orthogonal direction. The diameter of the wall portion 221A is slightly larger than the outer diameter of the side portion 222B of the first receiving portion 222. The wall portion 221A is provided with, at its center, a circular first hole portion 221D that penetrates the wall portion 221A in the orthogonal direction. The first hole portion 221D is a part of the wall portion 221A that defines a circular hole through which the first rod portion 21A passes. The first sphere portion 21B is disposed inward in the orthogonal direction with respect to the first hole portion 221D.

The first contact portion 221C is disposed at a clearance between the first ball stud 21 and the first hole portion 221D. The first contact portion 221C is made of a slidable resin material (for example, fluorocarbon resin, polyacetal). The first contact portion 221C contacts a part of the first sphere portion 21B positioned outward in the orthogonal direction. Here, the first contact portion 221C may not be provided. In the following description, in the case where the first rod portion 21A abuts against the first hole portion 221D, the first rod portion 21A may abut against the first hole portion 221D through the first contact portion 221C or directly abut against the first hole portion 221D. Thus, in the following description, the case where the first rod portion 21A abuts against the first hole portion 221D includes both of a case where the first rod portion 21A abuts against the first hole portion 221D through the first contact portion 221C and a case where the first rod portion 221A directly abuts against the first hole portion 221D.

The side portion 221B is a cylindrical portion that extends from a perimeter of the wall portion 221A inward in the orthogonal direction. The wall portion 221A and the side portion 221B are made of a resin material, for example, as a single piece. Screw threads are cut on an inner surface of the side portion 221B. Screw threads on the side portion 221B are fit into screw threads on the side portion 222B of the first receiving portion 222. This allows the first lid portion 221 to be threadedly engaged with the first receiving portion 222.

The first rod portion 21A, in the case where the first rod portion 21A is positioned at the center of the first hole portion 221D, extends outward in the orthogonal direction from the first sphere portion 21B supported by the first socket 22, bends in a direction different from the orthogonal direction at a first bent portion 23 and then is supported by the arm member 9. In the present embodiment, the first rod portion 21A is bent rearward with respect to the orthogonal direction at the first bent portion 23. An end 24 opposite to the first sphere portion 21B of the first rod portion 21A is fixed to the arm member 9 by a screw 41. In the example illustrated in FIG. 5, a bending angle R31 of the first rod portion 21A at the first bent portion 23 is 30 degrees as one example.

By slidably moving the first sphere portion 21B and the first rod portion 21A relative to the first socket 22, the first ball joint 2 allows the arm member 9 to be moved in any direction relative to the mounting member 8. The movable range of the arm member 9 is limited by abutting of the first rod portion 21A against the first hole portion 221D.

Figure 6:
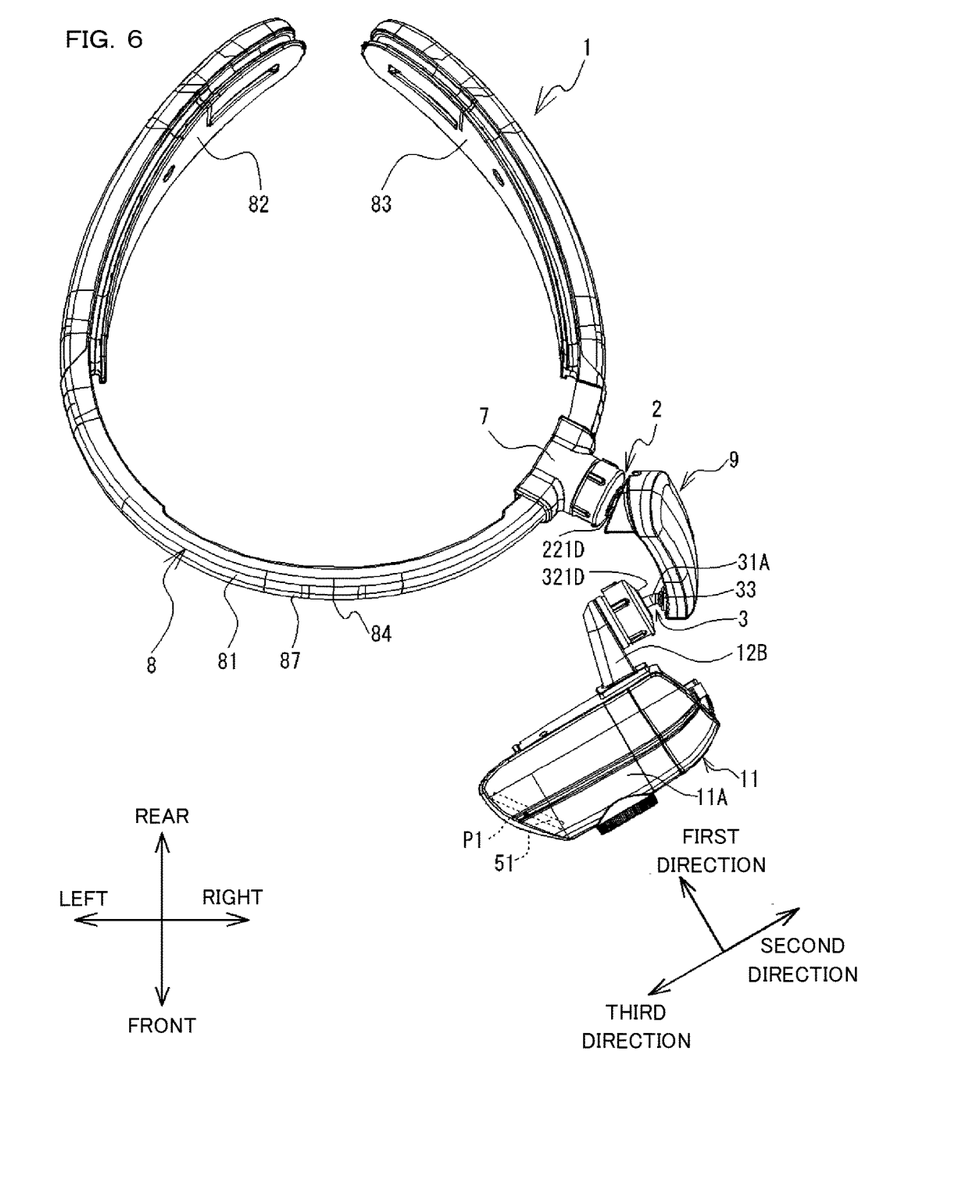
FIG. 6 is a plan view of the HMD 1 with the display casing 11 being in a first position.

The connection manner between the display casing 11 and the arm member 9 will be described in detail. In the present embodiment, the second ball joint 3 has a configuration similar to the first ball joint 2 since they are common components as one example. Thus, the description is omitted appropriately. As illustrated in FIG. 1 and FIG. 6, the second ball joint 3 connects to the arm member 9 a portion of the display casing 11 on the side of the second direction with respect to the half mirror 51, more specifically, the end of the protruding member 12B on the side of the first direction.

Figure 7:
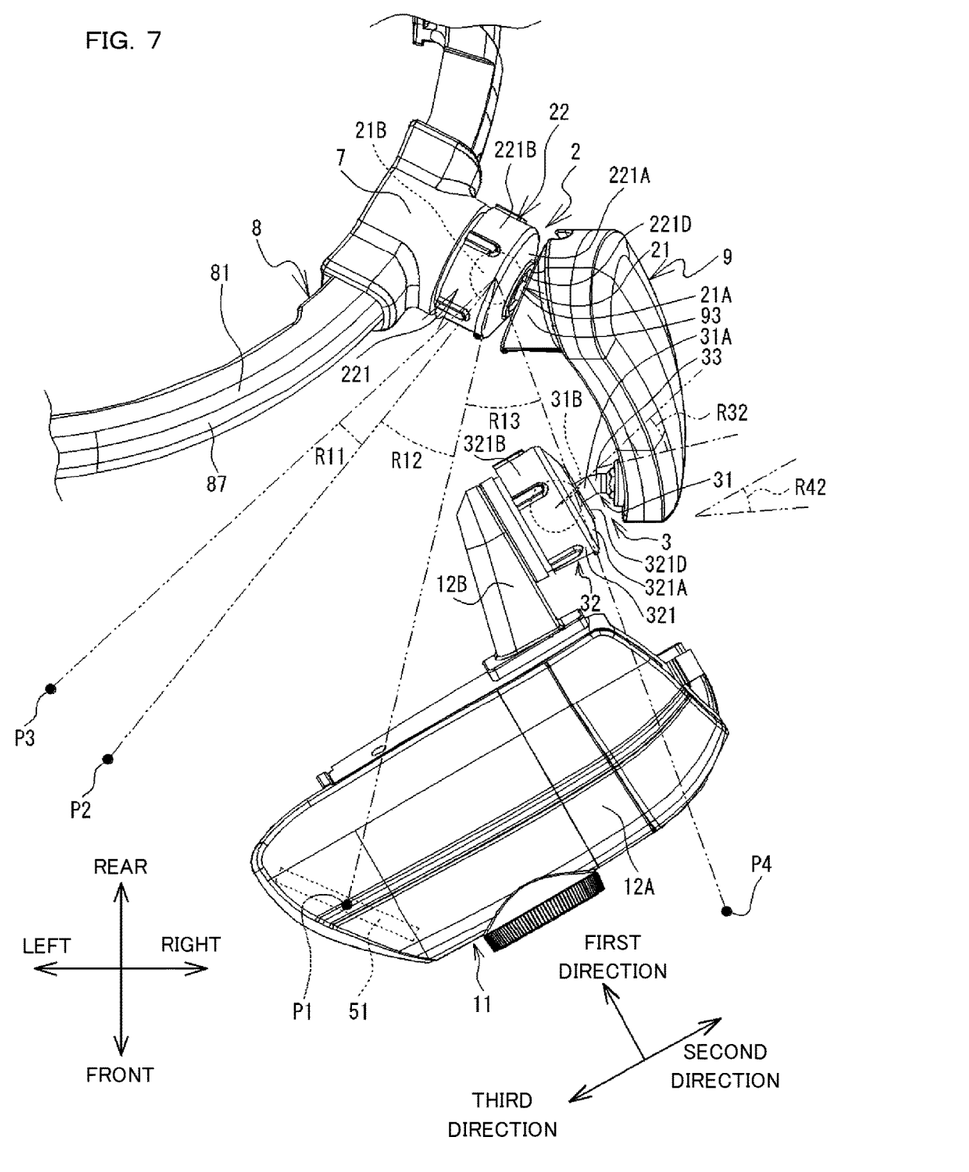
FIG. 7 is an enlarged view of the main components of the HMD 1 illustrated in FIG. 6.

As illustrated in FIG. 7, the second ball joint 3 is provided with the second ball stud 31 and a second socket 32. The second ball stud 31 is provided with the second rod portion 31A and a second sphere portion 31B. The second sphere portion 31B is a spherical portion provided at one end of the second rod portion 31A. The second socket 32 is provided in the display casing 11. The second socket 32 is positioned at an end, on the side of the first direction, of the protruding member 12B on the side of the second direction. Like the first socket 22 (see FIG. 5), the second socket 32 slidably supports the second sphere portion 31B.

The second socket 32 is provided with a second lid portion 321 and a second receiving portion (not illustrated). The second lid portion 321 and the second receiving portion (not illustrated) have similar configurations to the first lid portion 221 and the first receiving portion 222 of the first ball joint 2 as illustrated in FIG. 5.

The second lid portion 321 is provided with a wall portion 321A, a side portion 321B and a second contact portion (not illustrated). The wall portion 321A is a circular plate-shaped portion. A pair of surfaces with a large area of the wall portion 321A face the orthogonal direction. The wall portion 321A is provided with, at its center, a circular second hole portion 321D that penetrates the wall portion 321A in the second direction. The second hole portion 321D is a part of the wall portion 321A that defines a circular hole through which the second rod portion 31A passes. The second hole portion 321D has the same diameter as the first hole portion 221D (see FIG. 5). The second sphere portion 31B is disposed on the side of the third direction with respect to the second hole portion 321D.

The second contact portion (not illustrated) is disposed at a clearance between the second ball stud 31 and the second hole portion 321D. The second contact portion has the same shape as the first contact portion 221C (see FIG. 5). The second contact portion is made of a slidable resin material (for example, fluorocarbon resin and polyacetal). The second contact portion contacts a part of the second sphere portion 31B on the side of the second direction. Here, the second contact portion may not be provided. In the following description, in the case where the second rod portion 31A abuts against the second hole portion 321D, the second rod portion 31A may abut against the second hole portion 321D through the second contact portion or directly abut against the second hole portion 321D. Thus, in the following description, the case where the second rod portion 31A abuts against the second hole portion 321D includes both of a case where the second rod portion 31A abuts against the second hole portion 321D through the second contact portion and a case where the second rod portion 31A directly abuts against the second hole portion 321D.

The side portion 321B is a cylindrical portion that extends in the third direction from a perimeter of the wall portion 321A. The wall portion 321A and the side portion 321B are made of a resin material, for example, as a single piece. Screw threads are cut on an inner surface of the side portion 321B. Screw threads on the side portion 321B are fit into screw threads of the second receiving portion. This allows the second lid portion 321 to be threadedly engaged with the second receiving portion.

The second rod portion 31A, in the case where the second rod portion 31A is positioned at the center of the second hole portion 321D (see FIG. 6 and FIG. 7), extends in the second direction from the second sphere portion 31B supported by the second socket 32, bends in a direction different from the second direction at a second bent portion 33 and then is supported by the arm member 9. In the present embodiment, when the HMD 1 is oriented as illustrated in FIG. 1, FIG. 2, and FIG. 6 to FIG. 9, the second rod portion 31A extends from the arm member 9, bends nearer in a direction away from the mounting member 8 at the second bent portion 33, and is connected to the second sphere portion 31B supported by the second socket 32. The nearer in the direction away from the mounting member 8 indicates any direction including a component in the direction away from the mounting member 8. For example, one example of the direction away from the mounting member 8 is a front direction. In this case, any direction including a component of the front direction (for example, front left, front right) is included in a range of the nearer in the direction away from the mounting member 8. A bending angle R32 (see FIG. 7) of the second rod portion 31A at the second bent portion 33 is 30 degrees as one example. The bending angle R31 (see FIG. 5) of the first rod portion 21A at the first bent portion 23 is the same as the bending angle R32 (see FIG. 7) of the second rod portion 31A at the second bent portion 33. It is noted that an end opposite to the second sphere portion 31B of the second rod portion 31A is fixed to the lower end of the arm member 9 by a screw (not illustrated).

By slidably moving the first sphere portion 31B and the second rod portion 31A relative to the second socket 32, the second ball joint 3 allows the display casing 11 to be moved in any direction relative to the arm member 9. The movable range of the display casing 11 is limited by abutting of the second rod portion 31A against the second hole portion 321D.

An angle by which the first rod portion 21A rotates from the position where the first rod portion 21A is at the center of the first hole portion 221D to the position where the first rod portion 21A contacts the edge of the first hole portion 221D is regarded as a first rotation angle R41 (see FIG. 5). An angle by which the second rod portion 31A rotates from the position where the second rod portion 31A is at the center of the second hole portion 321D to the position where the second rod portion 31A contacts the edge of the second hole portion 321D is regarded as a second rotation angle R42 (see FIG. 7). The first rotation angle R41 and the second rotation angle R42 are the same (for example, 20 degrees).

Description will be given of an overview of an operation of the HMD 1. A user first wears the mounting member 8 of the HMD 1 on a head. The user holds the display casing 11 with the left hand and performs a positional adjustment so as to dispose the half mirror 51 in front of the left eye 80 (see FIG. 1). Image data starts to be output from external equipment (not illustrated). The control substrate (not illustrated) receives the image data through a signal line (not illustrated). The control substrate displays an image in accordance with the received image data on the liquid crystal panel 562. Image light of the image displayed on the liquid crystal panel 562 passes through the plurality of lenses included in the lens unit 53 toward the third direction. The half mirror 51 reflects the image light toward the side of the first direction. The image light is incident to the left eye 80 of the user. Also, the half mirror 51 allows external light, which is incident from the front, to be transmitted therethrough rearward. Thus, the user perceives an image in a state that a virtual image overlaps the landscape in front of the display casing 11 of the HMD 1.

The following will describe the movable range of the display casing 11 and the half mirror 51. In the following description, the position of the display casing 11 when the first rod portion 21A is positioned at the center of the first hole portion 221D and the second rod portion 31A is positioned at the center of the second hole portion 321D is called a first position as illustrated in FIG. 6 and FIG. 7. As illustrated in FIG. 1, the position of the display casing 11 when a virtual plane 86 is parallel to the first direction in which image light is emitted is called a second position. The virtual plane 86 is a plane that extends in the upper and lower direction orthogonal to the first direction and to the second direction and that is orthogonal to the middle 84 of the outer periphery 87 of the mounting member 8. In the present embodiment, the virtual plane 86 is also parallel to the front and rear direction. The middle 84 of the outer periphery 87 of the mounting member 8 is the middle of the symmetrical mounting member 8, and is a portion aligned with the middle between the right and left eye balls of the user. However, even if the mounting member 8 is not symmetrical, a portion of the mounting member that is assumed to be aligned with the middle between the right and left eye balls of the user is the middle 84 of the outer periphery 87 of the mounting member 8. In the case that the user wears the HMD 1 with the display casing 11 being located in the second position, it is assumed that the half mirror 51 is positioned in front of the user's line of sight.

Figure 8:
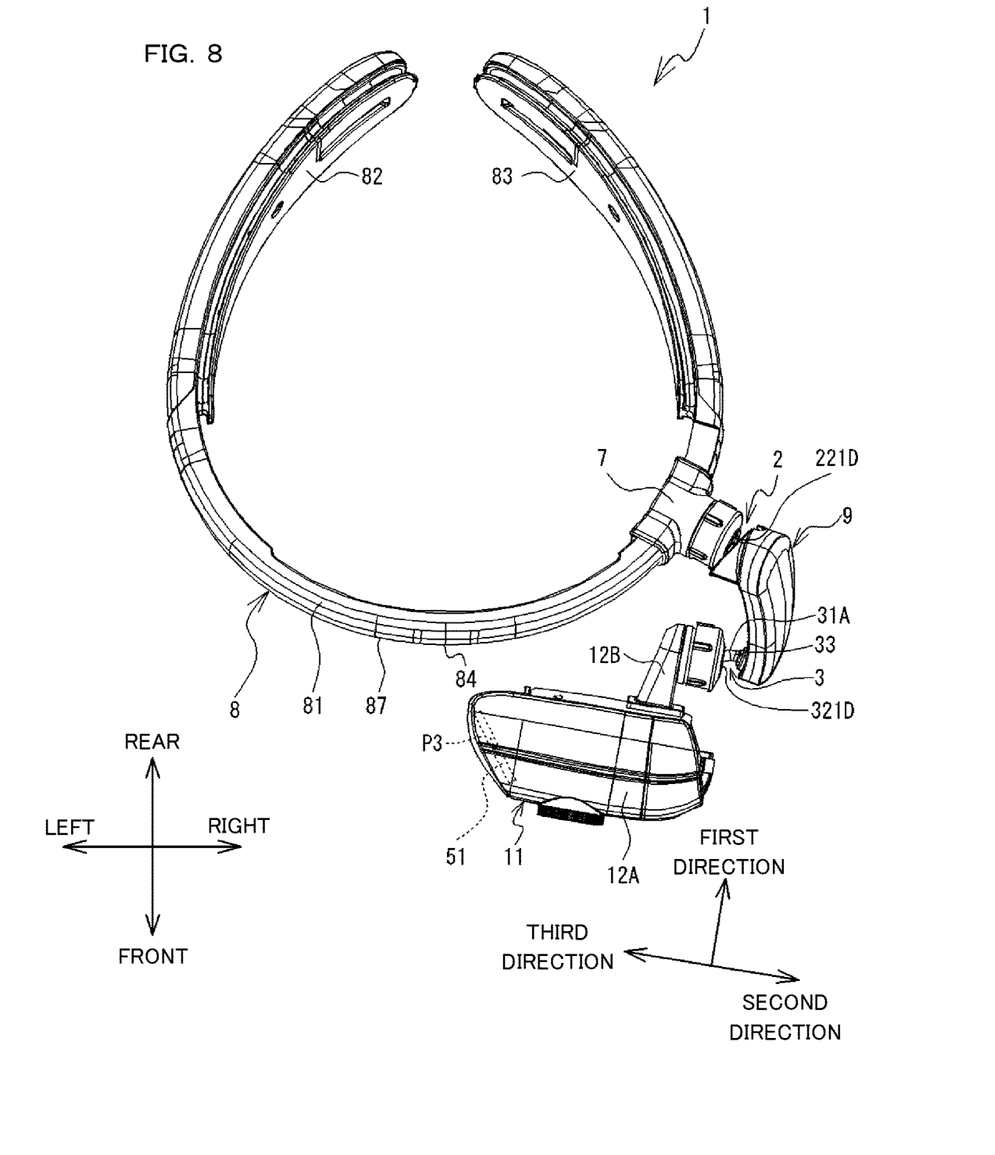
FIG. 8 is a plan view of the HMD 1 with the display casing 11 being in a third position.
Figure 9:
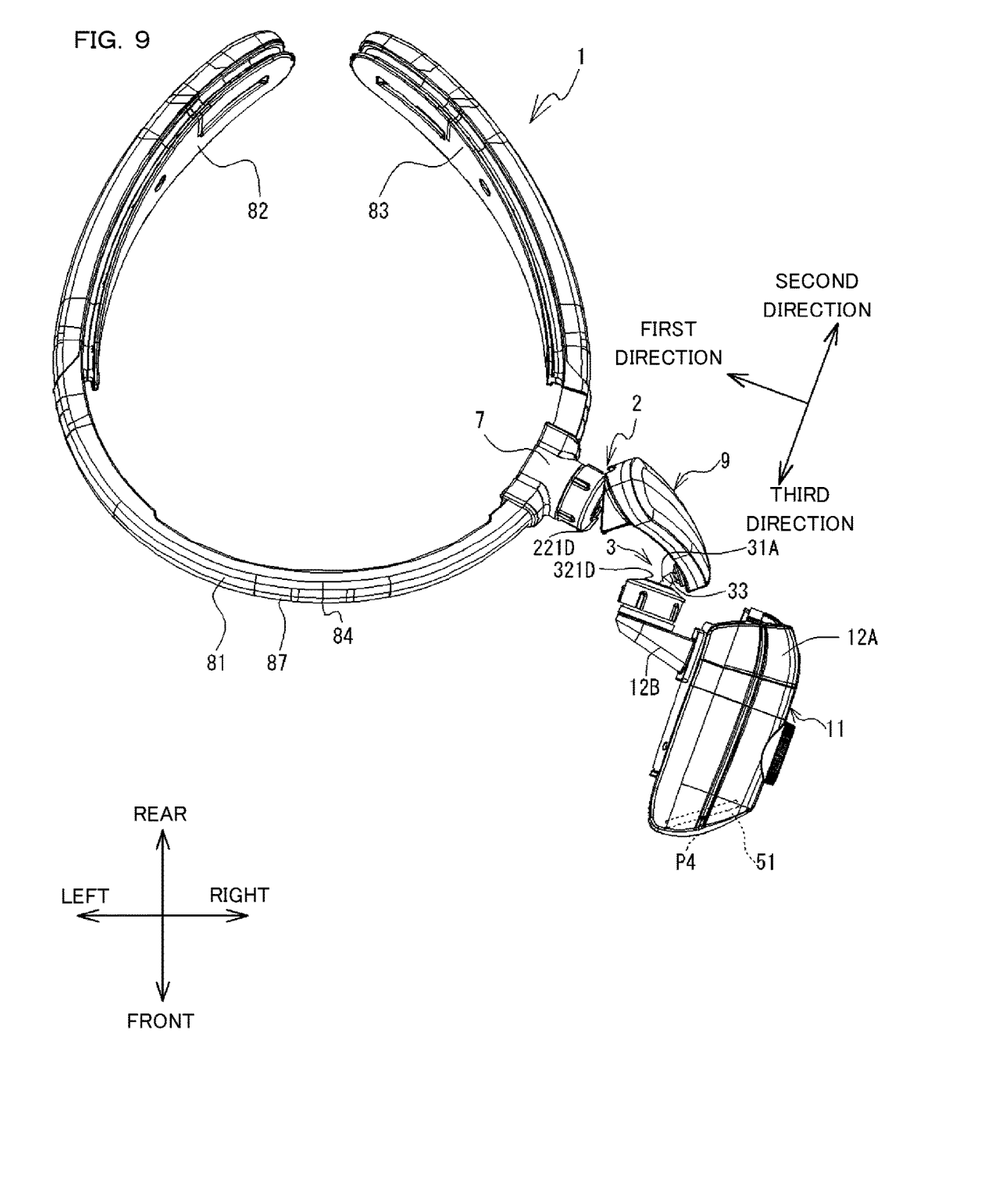
FIG. 9 is a plan view of the HMD 1 with the display casing 11 being in a fourth position.

As illustrated in FIG. 8, the position, when the first rod portion 21A rotates in a direction in which the display casing 11 is made to be closer to the mounting member 8 to abut against the edge (front end thereof in FIG. 8) of the first hole portion 221D and the second rod portion 31A rotates in the direction in which the display casing 11 is made to be closer to the mounting member 8 to abut against the edge (rear end thereof in FIG. 8) of the second hole portion 321D, is called a third position. As illustrated in FIG. 9, the position, when the first rod portion 21A rotates in a direction in which the display casing 11 is made to be away from the mounting member 8 to abut against the edge (rear end thereof in FIG. 9) of the first hole portion 221D and the second rod portion 31A rotates in the direction in which the display casing 11 is made to be away from the mounting member 8 to abut against the edge (right end thereof in FIG. 8) of the second hole portion 321D, is called a fourth position.

The display casing 11 in the present embodiment is movable between the third position (see FIG. 8) and the fourth position (see FIG. 9) with respect to the first position (see FIG. 6) functioning as the center. The second position (see FIG. 1) is present in the movable range from the first position (see FIG. 6) to the third position (see FIG. 8). The movable range is defined by a movable range of the first rod portion 21 A in the first hole portion 221D and a movable range of the second rod portion 31A in the second hole portion 321D.

A position P1 (see FIG. 6) of the half mirror 51 when the display casing 11 is in the first position is farther from the mounting member 8 than a position P2 (see FIG. 1) of the half mirror 51 when the display casing 11 is in the second position. A position P3 (see FIG. 8) of the half mirror 51 when the display casing 11 is in the third position is closer to the mounting member 8 than the position P2 (see FIG. 1) of the half mirror 51 when the display casing 11 is in the second position.

FIG. 7 illustrates the positions P1-P3 of the half mirror when the display casing 11 is in the first to third positions and a position P4 of the half mirror 51 when the display casing 11 is in the fourth position (see FIG. 9).

As illustrated in FIG. 7, in the movable range of the half mirror 51 with the first sphere portion 21B being centered, an angle between the position P2 of the half mirror 51 when the display casing 11 is in the second position and the position P3 of the half mirror 51 when the display casing 11 is in the third position is called a first angle R11. An angle between the position P2 of the half mirror 51 when the display casing 11 is in the second position and the position P1 of the half mirror 51 when the display casing 11 is in the first position is called a second angle R12. An angle between the position P4 of the half mirror 51 when the display casing 11 is in the fourth position and the position P1 of the half mirror 51 when the display casing 11 is in the first position is called a third angle R13. The first angle R11 is smaller than the second angle R12. Meanwhile, the third angle R13 is larger than each of the first angle R11 and the second angle R12.

The HMD 1 according to the present embodiment is structured as described above. The position P1 of the half mirror 51 when the display casing 11 is in the first position (see FIG. 6 and FIG. 7) is farther from the mounting member 8 than the position P2 of the half mirror 51 when the display casing 11 is in the second position (see FIG. 1). As described above, when the user wears the HMD 1 with the display casing 11 being located in the second position, it is assumed that the half mirror 51 is positioned in front of the left eye 80 of the user (see FIG. 1). The first position is a position of the display casing 11 when the first rod portion 21A is positioned at the center of the first hole portion 221D and the second rod portion 31A is positioned at the center of the second hole portion 321D (see FIG. 6 and FIG. 7). Thus, the display casing 11 when the first rod portion 21A is positioned at the center of the first hole portion 221D and the second rod portion 31A is positioned at the center of the second hole portion 321D has a wider movable range of the display casing 11 in the direction away from the mounting member 8 and a narrower movable range of the display casing 11 in the direction closer to the mounting member 8, than when the display casing 11 is at the same position as the second position or at the position closer to the mounting member than the second position. In other words, the movable range of the display casing 11 is wide in the direction away from the face of the user while the movable range of the display casing 11 is narrow in the direction closer to the face of the user. This makes it possible to widen the available movable range of the display casing 11 in the direction away from the face of the user.

As illustrated in FIG. 5, the first socket 22 is provided in the mounting member 8. The first rod portion 21A, in the case where the first rod portion 21A is positioned at the center of the first hole portion 221D, extends in the orthogonal direction from the first sphere portion 21B supported by the first socket 22, bends at the first bent portion 23 in the direction different from the orthogonal direction and then is supported by the arm member 9. Thus, the display casing 11 can be more easily positioned in the direction in which the first bent portion 23 is bent, than when the first bent portion 23 is not provided.

As illustrated in FIG. 7, the second socket 32 is provided in the display casing 11. The second rod portion 31A extends from the arm member 9, bends nearer in the direction away from the mounting member 8 at the first bent portion 33 and then is connected to the second sphere portion 31B supported by the second socket 32. As such, when the first rod portion 21A is positioned at the center of the first hole portion 221D and the second rod portion 31A is positioned at the center of the second hole portion 321D, the position of the display casing 11 is farther from the mounting member 8, than when the second bent portion 33 is not provided in the second rod portion 31A. Thus, the movable range of the display casing 11 is wider in the direction away from the face of the user and is narrower in the direction closer to the face of the user, than when the second bent portion 33 is not provided in the second rod portion 31A. This makes it possible to widen the available movable range of the display casing 11 in the direction away from the face of the user.

The bending angle R31 (see FIG. 5) of the first rod portion 21A at the first bent portion 23 is the same as the bending angle R32 (see FIG. 7) of the second rod portion 31A at the second bent portion 33. As such, the first ball stud 21 and the second ball stud 31 are more likely to be able to be constructed by the same component, than when the bending angle R31 and the bending angle R32 are different. Thus, commonality of components is more likely to decrease the cost than when different components are employed.

The first rotation angle R41 (see FIG. 5) where the first rod portion 21A rotates from the position where the first rod portion 21A is at the center of the first hole portion 221D to the position where the first rod portion 21A contacts the edge of the first hole portion 221D is the same as the second rotation angle R42 (see FIG. 7) where the second rod portion 31A rotates from the position where the second rod portion 31A is at the center of the second hole portion 321D to the position where the second rod portion 31A contacts the edge of the second hole portion 321D. Thus, the HMD 1 allows the user to more easily grasp the movable range of the display casing 11 than when the first rotation angle R41 and the second rotation angle R42 are different. Also, the first rotation angle R41 and the second rotation angle R42 are the same, and thus, the first hole portion 221D of the first socket 22 and the second hole portion 321D of the second socket 32 have the same diameter. As such, the first socket 22 and the second socket 32 are highly likely to be constructed by the same component. Thus, commonality of components is more likely to decrease the cost than when different components are employed.

Assuming that the third position (see FIG. 8) is the same as the second position (see FIG. 1), the half mirror 51 may not be disposed in front of the use's line of sight depending upon what degree the mounting member 8 fits into the head of the user, the intersection of the components, the manufacturing error or the like. In the present disclosure, the position P3 (see FIG. 8) of the half mirror 51 when the display casing 11 is in the third position is closer to the mounting member 8 than the position P2 (see FIG. 1) of the half mirror 51 when the display casing 11 is in the second position. Thus, the HMD 1 allows the user to adjust the display casing 11 to a position closer to the mounting member 8 than the second position. This makes it possible to easily position the half mirror 51 in front of the user's line of sight even in view of what degree the mounting member 8 fits into the head of the user, the intersection of the components, the manufacturing error or the like.

As illustrated in FIG. 7, the first angle R11 is smaller than the second angle R12. Thus, the available movable range of the display casing 11 in the direction away from the face of the user can be made wider, than when the first angle R11 is equal to or larger than the second angle R12.

It is noted that the present disclosure permits various modifications without being limited to the above-described embodiment. For example, the first angle R11 illustrated in FIG. 7 may be equal to or larger than the second angle R12. The position P3 (see FIG. 8) of the half mirror 51 when the display casing 11 is in the third position may be the same as the position P2 (see FIG. 1) of the half mirror 51 when the display casing 11 is in the second position. The first rotation angle R41 (see FIG. 5) where the first rod portion 21A rotates from the position where the first rod portion 21A is at the center of the first hole portion 221D to the position where the first rod portion 21A contacts the edge of the first hole portion 221D may be different from the second rotation angle R42 (see FIG. 7) where the second rod portion 31A rotates from the position where the second rod portion 31A is at the center of the second hole portion 321D to the position where the second rod portion 31A contacts the edge of the second hole portion 321D.

In addition, the bending angle R31 (see FIG. 5) of the first rod portion 21A at the first bent portion 23 may be different from the bending angle R32 (see FIG. 7) of the second rod portion 31A at the second bent portion 33. Also, the shapes of the first hole portion 221D and the second hole portion 321D are not limited to be circular. Any shape can be employed for the first hole portion 221D and the second hole portion 321D as long as the center thereof can be defined in a plan view (for example, a shape of point symmetry such as a rectangle, an oval).

Furthermore, the second socket 32 (see FIG. 7) may be provided in the arm member 9, not in the display casing 11. In this case, the second rod portion 31A may extend from the second sphere portion 31B disposed on the arm member 9, bend at the second bent portion 33 in a direction away from the mounting member 8, and be connected to the display casing 11, for example.

Also, the first socket 22 (see FIG. 5) may be provided in the arm member 9, not in the mounting member 8. In this case, the first rod portion 21A may extend in the orthogonal direction orthogonal to the outer periphery 87 of the mounting member 8, bend at the first bent portion 23 in a direction different from the orthogonal direction, and be connected to the first sphere portion 21B supported by the first socket 22, for example.

As long as the mounting member 8 is able to support the display casing 11 via the arm member 9, the mounting member 8 may take any shape different from the above-described embodiment. For example, a glasses-typed frame, a headphone-typed frame or the like may be employed as the mounting member. Alternatively, the mounting member is not limited to a dedicated mounting member. Anything that can be mounted on the head of the user such as a helmet, a cap or general glasses may be employed as the mounting member.

Also, when the first rod portion 21A is positioned at the center of the first hole portion 221D and the second rod portion 31A is positioned at the center of the second hole portion 321D, the second rod portion 31A may not bend nearer in the direction away from the mounting member 8. For example, the second rod portion 31A may linearly extend without bending. Alternatively, both of the first rod portion 21A and the second rod portion 31A may linearly extend without bending. Also in this case, it is only required that the position P1 (see FIG. 5 and FIG. 7) of the half mirror 51 in the first position of the display casing 11 when the first rod portion 21A is positioned at the center of the first hole portion 221D and the second rod portion 31A is positioned at the center of the second hole portion 321D is farther from the mounting member 8 than the position P2 (see FIG. 1) of the half mirror 51 in the second position of the display casing 11 when the virtual plane 86 is parallel to the first direction in which image light is emitted. Also, the HMD1 may be configured so as not to be provided with the mounting member 8.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims. Further, in the present specification and the attached claims, any item described in the singular includes such items in the plurality unless indicated specifically in the context.

What is claimed is:

1. A head-mounted display comprising:
    a mounting member that is curved in an arch shape and is able to be mounted on a head of a user;
    a display casing that includes a display unit and an emission unit which is able to deflect image light from the display unit and emit the image light in a first direction, and that extends in a second direction being one side of a direction orthogonal to the first direction;
    an arm member that extends from the mounting member to the display casing;
    a first ball joint that connects the mounting member to the arm member;
    a second ball joint that connects to the arm member at a portion closer to a side of the second direction than the emission unit in the display casing;
    a first ball stud that is included in the first ball joint and that is provided with a first rod portion and a first sphere portion disposed at one end of the first rod portion;
    a first socket that is included in the first ball joint, that slidably supports the first sphere portion and that is provided with a first hole portion through which the first rod portion passes;
    a second ball stud that is included in the second ball joint and that is provided with a second rod portion and a second sphere portion disposed at one end of the second rod portion; and
    a second socket that is included in the second ball joint, that slidably supports the second sphere portion and that is provided with a second hole portion through which the second rod portion passes,
    wherein a position of the emission unit in a first position of the display casing when the first rod portion is positioned at a center of the first hole portion and the second rod portion is positioned at a center of the second hole portion, is farther from the mounting member than a position of the emission unit in a second position of the display casing when a virtual plane that is orthogonal to the first direction and the second direction and that is orthogonal to a middle of an outer periphery of the mounting member is parallel to the first direction in which the image light is emitted.

2. The head-mounted display according to claim 1,
    wherein the first socket is provided in the mounting member, and
    wherein the first rod portion, when the first rod portion is positioned at the center of the first hole portion, extends from the first sphere portion supported by the first socket in an orthogonal direction orthogonal to the outer periphery of the mounting member, bends at a first bent portion in a direction different from the orthogonal direction, and is supported by the arm member.

3. The head-mounted display according to claim 2,
    wherein the second socket is provided in the display casing, and
    wherein the second rod portion extends from the arm member, bends at a second bent portion nearer in a direction away from the mounting member, and is connected to the second sphere portion supported by the second socket.

4. The head-mounted display according to claim 3,
    wherein a bending angle of the first rod portion at the first bent portion is equal to a bending angle of the second rod portion at the second bent portion.

5. The head-mounted display according to claim 1,
    wherein a first rotation angle by which the first rod portion rotates from a position where the first rod portion is at the center of the first hole portion to a position where the first rod portion contacts an edge of the first hole portion, is the same as a second rotation angle by which the second rod portion rotates from a position where the second rod portion is at the center of the second hole portion to a position where the second rod portion contacts an edge of the second hole portion.

6. The head-mounted display according to claim 1,
    wherein a position of the emission unit in a third position of the display casing when the first rod portion rotates in a direction in which the display casing is made to be closer to the mounting member to abut against an edge of the first hole portion and the second rod portion rotates in the direction in which the display casing is made to be closer to the mounting member to abut against an edge of the second hole portion, is closer to the mounting member than a position of the emission unit in the second position.

7. The head-mounted display according to claim 6, wherein in a movable range of the emission unit with the first sphere portion being centered, a first angle between the position of the emission unit in the second position and the position of the emission unit in the third position is smaller than a second angle between the position of the emission unit in the second position and the position of the emission unit in the first position.

8. An image display device comprising:
a display casing that is provided with a display unit and an emission unit which is able to deflect image light from the display unit and emit the image light in a first direction, and that extends in a second direction being one side of a direction orthogonal to the first direction;
capable of being mounted on a head to the display casing;
a first ball joint that connects the mounting member to the arm member;
a second ball joint that connects to the arm member at a portion closer to a side of the second direction than the emission unit in the display casing;
a first ball stud that is included in the first ball joint and that is provided with a first rod portion and a first sphere portion disposed at one end of the first rod portion;
a first socket that is included in the first ball joint, that slidably supports the first sphere portion, and that is provided with a first hole portion through which the first rod portion passes;
a second ball stud that is included in the second ball joint and that is provided with a second rod portion and a second sphere portion disposed at one end of the second rod portion; and
a second socket that is included in the second ball joint, that slidably supports the second sphere portion and that is provided with a second hole portion through which the second rod portion passes,
wherein the second rod portion is provided with a bent portion that is bent nearer in a direction away from the mounting member when the first rod portion is positioned at a center of the first hole portion and the second rod portion is positioned at a center of the second hole portion.

9. A head-mounted display comprising:
a mounting member that is curved in an arch shape and is able to be mounted on a head of a user;
a display casing that includes a display unit and an emission unit which is able to emit image light from the display unit in a first direction;
an arm member that extends from the mounting member to the display casing;
a first ball joint that connects the mounting member to the arm member;
a second ball joint that connects to the arm member at a portion closer to a side of a second direction being one side of a direction orthogonal to the first direction, than the emission unit in the display casing;
a first ball stud that is included in the first ball joint and that is provided with a first rod portion and a first sphere portion disposed at one end of the first rod portion;
a first socket that is included in the first ball joint, that slidably supports the first sphere portion and that is provided with a first hole portion through which the first rod portion passes;
a second ball stud that is included in the second ball joint and that is provided with a second rod portion and a second sphere portion disposed at one end of the second rod portion; and
a second socket that is included in the second ball joint, that slidably supports the second sphere portion and that is provided with a second hole portion through which the second rod portion passes,
wherein a position of the emission unit in a first position of the display casing when the first rod portion is positioned at a center of the first hole portion and the second rod portion is positioned at a center of the second hole portion, is farther from the mounting member than a position of the emission unit in a second position of the display casing when a virtual plane that is orthogonal to the first direction and the second direction and that is orthogonal to a middle of an outer periphery of the mounting member is parallel to the first direction in which the image light is emitted.

* * * * *